July 7, 1959  D. R. WADE  2,893,252
AUTOMATIC POWER TRANSMISSION FOR MINIATURE VEHICLES
Filed March 31, 1955  2 Sheets-Sheet 1

INVENTOR.
DOUGLASS R. WADE
BY
ATTORNEY

July 7, 1959

D. R. WADE 2,893,252

AUTOMATIC POWER TRANSMISSION FOR MINIATURE VEHICLES

Filed March 31, 1955

INVENTOR.
DOUGLASS R. WADE
BY
William J. Ruano
ATTORNEY

United States Patent Office 2,893,252
Patented July 7, 1959

2,893,252

AUTOMATIC POWER TRANSMISSION FOR MINIATURE VEHICLES

Douglass R. Wade, Boyertown, Pa.

Application March 31, 1955, Serial No. 498,284

1 Claim. (Cl. 74—230.17)

This invention relates to a miniature automotive device, and, more particularly, to an automotive power transmission which is especially useful for driving light vehicles, such as a child's car, a garden tractor, or the like, by means of an internal combustion engine, and wherein it is necessary to drive the traction wheel or wheels at a speed considerably less than that of the engine shaft.

An outstanding disadvantage of the conventional types of miniature vehicles powered by a combusion engine has been that they are relatively complicated and expensive in construction, and they do not permit speed change over a wide range of speeds without sacrificing speed for power or vice versa, moreover the power is not transmitted smoothly under different loading conditions and the engine has a tendency to stall when subjected to overloads.

An object of my invention is to provide an automatic, variable speed driving mechanism for miniature automotive devices and the like, which driving mechanism is devoid of the above named disadvantages of conventional structures, more particularly, to provide an automatic pulley transmisison and drive which is relatively simple and inexpensive in construction and which increases the transmitted power of the engine over a wide speed range, and which transmits power smoothly under both light and heavy loads, and avoids any tendency to stall when subjected to overloads.

A more specific object of my invention is to provide a spring loaded mounting for a combusion engine which drives an automatic pulley transmission including a V-belt type pulley and for the purpose of varying the speed ratio of the transmission by varying the tension and position of the belt on its driven cones in response to movement of the motor mounting.

Other objects and advantages of the present invention will become apparent from a study of the following description taken with the accompanying drawing, wherein.

Figure 1:
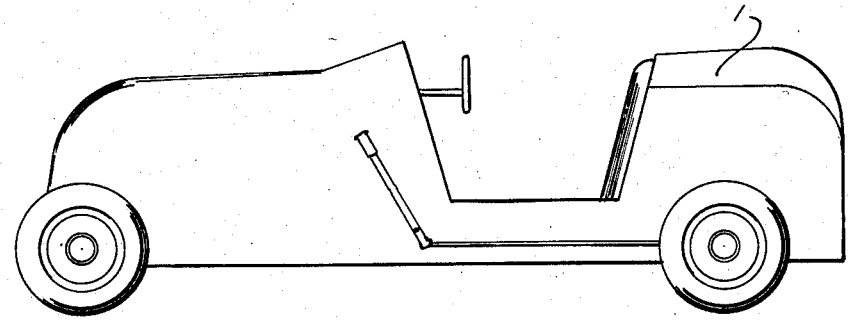
Figure 1 is a side view of a child's car which is powered by a combusion engine including an automatic variable speed drive.
Figure 2:
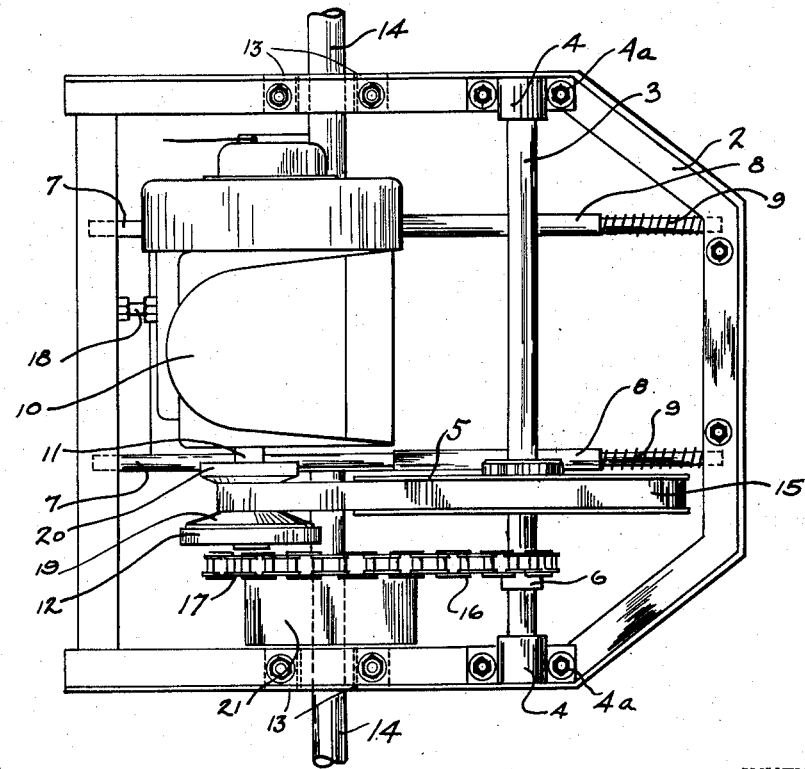
Figure 2 is a top view of an automatic variable speed driving mechanism embodying the principles of my invention.

Referring more particularly to the drawing, numeral 10 denotes an internal combustion engine and numeral 11, the engine shaft. The engine 10 is securely fastened to a spring loaded motor mount 7 comprising a pair of parallel rods. The motor mount 7 is supported on frame 2 by projecting the ends of the rods through four holes in cross members of frame 2. Frame 2 is supported on two bearings 13 placed on driving axle 14 (which may be the rear axle) on which one or more wheels are keyed or otherwise secured and rotate with the axle 14.

Keyed or otherwise secured on and to rotate with engine shaft 11 is a centrifugally actuated V-belt clutch type pulley 12 comprising relatively slidable cones 19 and 20 and a V-belt 15 therebetween. In the V-section of pulley 12, V-belt 15 drives a secondary pulley 5 which is keyed or otherwise secured on and rotates with a countershaft 3. Countershaft 3 is supported by two bearings 4 which are attached to main frame 2, by bolts 4a placed in slotted holes to provide a means of adjustment for the tension and normal wear of chain 16.

Also keyed or otherwise secured on and rotating with countershaft 3 is a primary sprocket wheel 6 which drives a chain 16 which, in turn, drives a secondary sprocket wheel 17, to which a brake drum 21 may or may not be attached. Secondary sprocket wheel 17 is keyed or otherwise secured to the driving axle 14 which transmits power to one or both wheels which are secured to axle 14, depending upon the type of vehicle driven.

Figures 4, 5, 6:
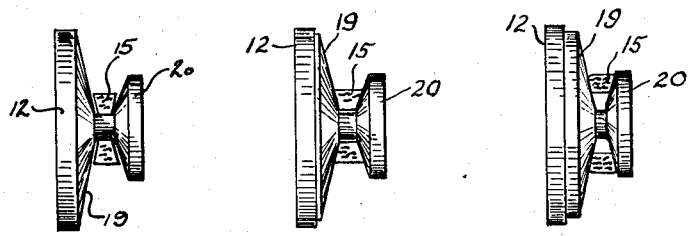
Figure 4 is a side view of the pulley of Figures 2 and 3 and showing the position of the parts at idling speed.
Figure 5 shows the pulley parts at low speed.
Figure 6 shows the pulley parts at high speed.

Engine stop 18 is fastened to a cross member of frame 2 and is adjustable to provide the proper distance from the center of engine shaft 11 to the center of countershaft 3 so that V-belt 15 will fit loosely around the center of pulley 12 as shown in Figure 4 to permit the engine to run at idling speed with no load on belt 15. Engine 10 is held firmly against adjustable stop 18 by compression springs 9. Tension on springs 9 may be increased or decreased by different lengths of spacers 8.

Figure 3:
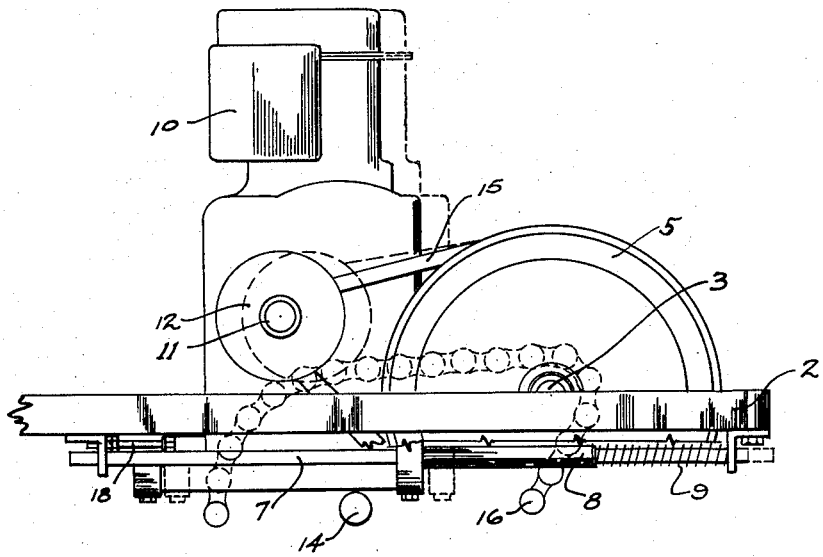
Figure 3 is a side view of the mechanism shown in Figure 2.

As the speed of engine 10 is slightly increased, floating cone 19 of pulley 12 engages the sides of V-belt 15, as shown in Figure 5, and starts the driving mechanism in motion in a low speed range. As the speed of engine 10 is further increased, the motor 10 and its mount together with pulley 12 will move towards the position shown in dash lines in Figure 3, and floating cone 19 of the centrifugal clutch type pulley 12 moves toward the inner fixed cone 20 and thereby puts more tension on V-belt 15. This tension on pulley 12, fastened to engine shaft 11, causes motor 10 and motor mount 7 to move toward countershaft 3, thereby decreasing the distance between engine shaft 11, on which is mounted centrifugal pulley 12, and countershaft 3, which permits V-belt 15 to run toward the outer edges of cones 19 and 20 as shown in Figure 6 and thereby provide a higher or intermediate range of speed.

At or near top engine speed, the outer edge of belt 15 will run even with the outside diameter of fixed cone 20 at the highest range of speed. With this type spring loaded mount 7, the vehicle will always start in the lowest speed range. However, the time in which the motor mount 7 moves engine 10 to the higher or highest speed is governed by the speed of engine shaft 11 and the amount of tension on springs 9.

The above described automatic, variable speed, power transmission device is suitable for driving a wide variety of devices or vehicles, particularly small vehicles, such as a child's automobile, tricycle or scooter.

Thus it will be seen that I have provided a highly efficient, relatively simple and inexpensive automatic, variable speed, driving mechanism which provides transmission of considerably greater power than previous devices over a wide range of speed, with amazing smoothness and with practically no tendency to stall at considerable overloads; furthermore I have provided an automatic power transmission which is particularly suitable for driving small vehicles, such as a child's auto, garden tractor, etc., by means of an internal combustion engine wherein it is necessary to drive the traction wheel or wheels at a speed considerably less than the R.P.M. speed of the engine shaft; furthermore I have provided a drive mechanism for providing a fully automatic, variable speed drive in response to the speed of the driving engine.

While I have illustrated and described a specific embodiment of my invention, it will be understood that this is by way of illustration only, and that various changes and modifications may be made within the contemplation of my invention and within the scope of the following claim.

I claim.

A vehicle drive comprising, in combination, a vehicle frame including a portion of substantially rectangular outline having vertical flanges, a pair of horizontal support rods having end portions mounted on said vertical flanges, an internal combustion engine including a drive shaft extending at right angles to said rods, said engine being supported on said rods so as to enable free, horizontal sliding movement of said engine in the direction of said rods, helical springs surrounding said rods for yieldably resisting said sliding movement by compression of said springs, adjustable stop means for adjustably limiting sliding movement caused by said springs, a driven shaft stationarily mounted on said frame for driving said vehicle, said driven shaft having a pulley of larger diameter than that of the drive shaft and which is rigidly secured thereto, said drive shaft including a centrifugal, automatic, speed changing pulley having opposed cones, one of which is fixed to said shaft and the other being relatively slidable in an axial direction, said cones presenting opposed inclined conical faces with a spacing of substantially V-shaped cross-section, a belt of corresponding cross section to that of said spacing interconnecting said drive and driven shafts and looped between said cones in frictional driving relationship therewith so that upon an increase of speed of said engine, said slidable cone will move axially toward said fixed cone as the result of centrifugal force, forcing the belt radially outwardly so as to cause sliding movement of said engine toward said driven shaft so as to compress said springs to increase the speed of said driven shaft and vehicle, and whereby upon decrease in speed of said engine and pulley, the compressive force of said springs will push said engine in an opposite direction to allow said belt to move radially inwardly of said cones to decrease the speed of the driven shaft and vehicle.

References Cited in the file of this patent

UNITED STATES PATENTS

| | | |
|---|---|---|
| 1,570,591 | Mercer | Jan. 19, 1926 |
| 2,211,986 | Pfleger | Aug. 20, 1940 |
| 2,395,625 | Heyer | Feb. 26, 1946 |
| 2,585,732 | Braman | Feb. 12, 1952 |

FOREIGN PATENTS

| | | |
|---|---|---|
| 435,257 | Great Britain | Sept. 18, 1935 |